United States Patent [19]

Keough

[11] Patent Number: 5,223,553
[45] Date of Patent: Jun. 29, 1993

[54] ANTISTATIC RESIN COMPOSITION

[75] Inventor: Allen H. Keough, Sudbury, Mass.

[73] Assignee: Metallized Products, Inc., Winchester, Mass.

[21] Appl. No.: 799,776

[22] Filed: Nov. 27, 1991

Related U.S. Application Data

[60] Continuation of Ser. No. 268,656, Nov. 7, 1988, abandoned, which is a continuation of Ser. No. 912,105, Sep. 26, 1986, abandoned, Division of Ser. No. 750,648, Jun. 28, 1985, Pat. No. 4,623,594, which is a continuation of Ser. No. 588,337, Mar. 12, 1984, abandoned, which is a continuation-in-part of Ser. No. 473,593, Mar. 9, 1983, abandoned.

[51] Int. Cl.$^5$ .................. C08F 26/02; C08G 59/17; C08K 5/19
[52] U.S. Cl. ........................ 522/78; 522/74; 522/79; 522/90; 522/100; 528/75; 528/393
[58] Field of Search .......... 528/393, 75; 525/531, 525/528; 526/320, 266, 310; 522/71, 78, 100, 90

[56] References Cited

U.S. PATENT DOCUMENTS

| | | |
|---|---|---|
| 2,897,170 | 7/1959 | Gruber . |
| 3,445,440 | 5/1969 | Susi et al. . |
| 4,097,417 | 6/1978 | Pastor et al. . |
| 4,100,040 | 7/1978 | Rosenberg . |
| 4,131,602 | 12/1978 | Hodakowski et al. . |
| 4,138,300 | 2/1979 | Kaetsu et al. . |
| 4,154,344 | 5/1979 | Yenni, Jr. et al. . |
| 4,156,751 | 5/1979 | Yenni, Jr. et al. . |
| 4,177,310 | 12/1979 | Steeves . |
| 4,273,633 | 6/1981 | Carder et al. . |
| 4,291,097 | 9/1981 | Ramada et al. ............ 522/78 |
| 4,322,331 | 3/1982 | Shay . |
| 4,405,426 | 9/1983 | Hosoi et al. . |
| 4,427,823 | 1/1984 | Inagaki et al. . |
| 4,756,414 | 7/1988 | Mott . |

FOREIGN PATENT DOCUMENTS

| | | |
|---|---|---|
| 0003741 | 9/1979 | European Pat. Off. . |
| 0012948 | 7/1980 | European Pat. Off. . |
| 0012949 | 7/1980 | European Pat. Off. . |
| 0082603 | 6/1983 | European Pat. Off. . |
| 1378971 | 1/1975 | United Kingdom . |
| 1504364 | 3/1978 | United Kingdom . |
| 2054615 | 2/1981 | United Kingdom . |
| 2097415 | 11/1982 | United Kingdom . |
| 2118562 | 11/1983 | United Kingdom . |

OTHER PUBLICATIONS

"Transparent Antistatic Films", Chemical Abstracts, vol. 100, Abstract No. 69516y (1984).
"Surface Coating of Polymeric Materials", Chemical Abstracts, vol. 74, Abstract No. 77014t (1971).
"Hydrophilic Resin", Chemical Abstracts, vol. 82, Abstract No. 58927s, (1975).
Senich, G. A. & Florin, R. E., "Radiation Curing of Coatings" Rev. Mactromol Chem. Phys, C24(2), 283 (1984).
K. O'Hara, "Liquid Resin Systems For UV Curing", Polymer Paint Colour Journal, Apr. 17, 254 (1985).

Primary Examiner—Jacob Ziegler

[57] ABSTRACT

An antistatic resin composition which is the electron radiation cured reaction product of an electron radiation curable prepolymer and an electron radiation reactive antistatic agent soluble in the prepolymer. An antistatic laminate is made by applying a mixture of the prepolymer and antistatic agent to a substrate and then contacting the mixture with electron radiation.

12 Claims, No Drawings

ANTISTATIC RESIN COMPOSITION

CROSS-REFERENCE TO RELATED APPLICATION

This is a continuation of U.S. patent application Ser. No. 268,656, filed Nov. 7, 1988 (now abandoned) which is a continuation of Ser. No. 912,105, filed Sep. 26, 1986 (now abandoned) which is a divisional of Ser. No. 750,648, filed Jun. 28, 1985 (now U.S. Pat. No. 4,623,594 which is a continuation of Ser. No. 588,337, filed Mar. 12, 1984 (now abandoned) which is a continuation-in-part of Ser. No. 473,593 filed Mar. 9, 1983 (now abandoned).

BACKGROUND OF THE INVENTION

This invention relates to resin compositions having antistatic characteristics. More particularly, this invention relates to resin compositions comprising an electron radiation cured product of an electron radiation curable resin precursor and an electron radiation reactive antistatic agent. In other aspects, the present invention relates to a method of making an antistatic resin composition and further to substrate sheets coated therewith. Plastics such as polyethylene, polypropylene and the like are poor conductors of electricity and have a tendency to develop and retain electrostatic charges which attract and hold dust particles. This tendency can have a detrimental effect on the appearance of the plastic, but is especially detrimental for plastic films which are used as packaging materials for delicate electronic devices, such as floppy discs for computers, or are used for hospital operating room supplies. For these kinds of uses, electrostatic charges can have a detrimental effect on the function of the plastic material. It is, of course, also well known that the build up of electrostatic charges in plastic films leads to handling and other problems in manufacturing or converting processes, especially where plastic films are transported at high speed.

One method which can be used to reduce the build up of static electricity in plastics is to add a nonreactive antistatic additive, such as a quaternary ammonium compound or carbon, when compounding the plastic matrix. The additive exudes to the surface of the plastic during processing and reduces the build up of static electricity at the surface of the plastic. This method, however, offers only short term antistatic protection. Another method for reducing static build-up involves providing a light vacuum metallized film on the plastic resin. This method, however, suffers from the disadvantage of environmental instability since the metal used to provide the conductivity characteristics is susceptible to attack by moisture and or other corrosive conditions.

Thus, it would be highly desirable to provide a resin composition having a reduced tendency to form static charges both before and after fabrication and to provide antistatic laminations comprising the resin composition. It also would be highly desirable to develop a more permanent method involving copolymerizing or crosslinking an antistatic agent with a resin to provide long lasting antistatic characteristics throughout the resin.

In accordance with the present invention, it has been found that resin compositions having desirable antistatic properties can be provided by electron radiation curing a composition comprising an electron radiation curable resin precursor and an electron radiation reactive antistatic agent. The antistatic composition can be used to coat a substrate sheet to provide an antistatic lamination. Further understanding of the present invention will be had from the following disclosure wherein all parts and percentages are by weight unless otherwise indicated.

SUMMARY OF THE INVENTION

In accordance with the present invention, an antistatic resin composition comprises the electron radiation cured reaction product of: (A) an electron radiation curable prepolymer; and (B) an effective amount of an electron radiation reactive antistatic agent soluble in said prepolymer. In accordance with the method of the present invention, an antistatic resin composition is made by: (A) mixing an electron radiation curable prepolymer and an effective amount of an electron radiation reactive antistatic agent to form a mixture thereof; and (B) contacting said mixture with electron radiation in an amount sufficient to cure said mixture. Further in accordance with the present invention the antistatic resin may be provided as an antistatic coating on a substrate, such as a metallized substrate sheet. Preferably the antistatic agent is a quaternary ammonium salt.

DESCRIPTION OF THE INVENTION

The antistatic resin composition of the present invention broadly comprises the reaction product of a radiation curable precursor and an effective amount of a radiation reactive antistatic agent. In accordance with the method of the present invention, the antistatic resin composition is made by mixing a radiation curable resin precursor and a radiation reactive antistatic agent to provide a mixture thereof. The reactive antistatic agent is employed in an amount which is effective to obtain the desired antistatic properties. The mixture is then contacted with electron radiation in sufficient amount to cure the mixture. During radiation curing, the antistatic agent reacts with the radiation curable resin precursor to form a polymerized resin having long lasting antistatic characteristics.

The antistatic resin compositions of the present invention are especially useful as coating materials and in one embodiment of the present invention, an antistatic coating of the present invention is provided on a substrate material such as paper, polyethylene, polypropylene or the like. A preferred embodiment of the present invention comprises a substrate material having a continuous thin layer of conductive metal such as aluminum deposited thereon and a continuous thin layer of the antistatic resin composition of the present invention overcoating the thin layer of aluminum.

Radiation curable resin precursors suitable for use herein are commercially available and well known in the art. Generally speaking, the radiation curable precursor comprises a mixture of at least one oligomer and mono and/or multi-functional monomers. Generally speaking, the oligomers constitute the backbone of a radiation curable coating and largely determine the ultimate performance of the finally cured coating. Many oligomers are based on acrylate chemistry because of ease of synthesis and cost. For example, suitable oligomers include the epoxy-acrylate, polyester-urethane-acrylates, polyether-acrylates, and polyester-acrylates. Acrylated-epoxy resins tend to have good adhesion and chemical resistance properties. Acrylated-urethane-polyesters tend to cure to hard, tough, flexible chemically resistant coatings. Acrylated-polyethers tend to cure to tough, abrasion resistant coatings, and are generally of lower viscosity than polyurethanes and epoxies. Acrylated-polyesters tend to have low viscosity and good weatherability.

Oligomers, however, when used by themselves, may shrink excessively on curing and/or have an unworkable application viscosity. Thus, monomers and other additives, such as flow control agents, will be generally used in combination with oligomers to provide a radiation curable prepolymer. Backbone oligomers can be used in conjunction with a wide variety of monomers, both mono- and multi-functional. It will be appreciated by those skilled in the art that proper selection of monomers contributes to the final cured coating properties by controlling the cross-link density, hardness, flexibility, cure speed, etc., and, hence, the particular monomers selected will depend upon the final coating properties desired. Generally, combinations of mono- and multi-functional monomers will be preferred to achieve the desired results.

Examples of useful mono-functional monomers include: n-vinyl-2-pyrollidone, 2-phenoxyethylacrylate, n-isobutoxymethylacrylamide, isobornylacrylate, 2-ethoxyethoxyethylacrylate, and tetrahydrofurfurylacrylate. N-vinyl-2-pyrollidone is especially useful because of its abrupt viscosity reduction in small amounts, and high response to electron beam radiation.

Suitable multi-functional monomers include: 1,6-hexanediol diacrylate, tripropyleneglycoldiacrylate, trimethylolpropanetriacrylate, pentaerythritoltriacrylate, and tetraethyleneglycoldiacrylate.

Antistatic agents suitable for use herein are antistatic agents which are electron radiation reactive with the radiation curable resin precursor and which are soluble in the resin precursor. It has been found that useful agents for use herein are quaternary ammonium salts such as trialkylalkyletherammonium salts. A preferred salt is a trialkylalkyetherammonium salt wherein each of the trialkyl groups has from 1 to about 3 carbon atoms, the alkylether group has an alkyl group having from about 4 to about 18 carbon atoms, and the ether group is selected from the group consisting of ethylene oxide and propylene oxide. An example of a preferred salt is triethylalkyletherammonium sulfate, commercially available as Emerstat 6660 from Emery Industries. The antistatic agent is mixed with the radiation curable resin precursor in an amount effective to obtain the desired antistatic characteristics for the resin composition upon curing thereof. The exact amount will vary from resin to resin, antistatic agent to antistatic agent, and intended use for the resulting product.

One advantage of the antistatic resin compositions of the present invention is that they are especially suitable for use as coatings upon substrates. Substrates contemplated for use in combination with the compositions of the present invention include webs, sheets or films such as paper, glass, polymer coated paper, woven and non-woven sheets of various materials, various polymeric films such as polyethylene film, polypropylene film, polyethyleneterephthalate film, polyvinyl chloride film, ionomer resin film and the like, and include metallized substrates.

Coating of the antistatic compositions of the present invention onto a substrate can be done in any conventional manner. Generally speaking, the coating composition will be applied to the substrate surface in the form of a prepolymer and antistatic agent mixture and then cured in situ by means of electron beam radiation. Generally speaking the coating need be applied and cured on only one side of the substrate. Both sides of the substrate generally benefits in obtaining antistatic characteristics even though the substrate has been coated with the antistatic composition on only one side so long as the substrate is not too thick and a sufficient dosage of radiation is employed to cure the coating. This phenomenon can be observed on substrates of thicknesses at least as great as 10 mils and can be observed not only on polymeric films such as polyethylene film, polypropylene film, polyethyleneterephthalate film, polyvinyl chloride film, ionomer resin film and the like, but also on paper, glass and other webs such as can be made from various woven and non-woven fibrous materials. Furthermore, these substrates can have a continuous thin layer of conductive metal such as aluminum deposited thereon as by a conventional vacuum metallizing process and the coating can be applied to the metallized or non-metallized side of the substrate.

The coating can be applied by dip coating, air-knife coating, roll coating, gravure coating, reverse gravure coating, extrusion coating, bead coating, curtain coating, use of wire wound coating rods, and so forth. The coating deposited on the substrate is effective even as a thin coating having a thickness on the order of from 0.1 to 0.5 mils. Of course, the viscosity of the coating composition can vary widely depending upon the method of coating which is chosen and the desired end results. Typical viscosity of coatings may range from 50 to about 1000 centipoise.

Apparatus and methods for curing of the radiation curable antistatic resin composition are well known and any suitable radiation curing process and apparatus can be used in carrying out this invention. Suitable apparatus are commercially available from Energy Sciences, Inc. of Woburn, Mass. under the tradename Electrocurtain ®. Examples of suitable apparatus are disclosed in U.S. Pat. Nos. 3,702,412, Nov. 7, 1972 to Quintal; 3,769,600, Oct. 30, 1973 to Denholm et al; and 3,780,308, Dec. 18, 1973 to Nablo. High energy ionizing radiation such as electron beam radiation should be used in sufficient intensity to penetrate substantially all the way through the coating composition to cure the same. Typically dosages in the range of from about 1 to about 6 megarads are employed. Upon contacting the antistatic resin composition with radiation and sufficient intensity to cure the same, the composition used in the present invention is substantially completely converted to a solid product.

In a preferred embodiment of the present invention, a continuous thin layer of conductive metal is sandwiched between a substrate and the antistatic coating of the present invention. Thus, a metal layer can be first applied onto a surface of a substrate and then a continuous coating of the antistatic composition is applied to overcoat the metal layer to provide a laminate having especially good antistatic properties. Generally speaking, the antistatic coating will be applied to the metal in the form of an uncured mixture of prepolymer and antistatic agent and then cured in situ on the metallic layer. Suitable metals include aluminum, copper, gold, silver, and the like. The metal layer is preferably deposited in a conventional vacuum metallizing step. A resin coated paper with metallized layer thereon especially suitable to be overcoated with an antistatic resin composition of this invention is taught in U.S. Pat. No. 4,177,310, Dec. 4, 1979 to Steeves, the disclosure of which is specifically incorporated by reference herein.

The antistatic resin compositions of the present invention are useful in several types of products. For example, the coating may be used as an overcoating for photographic film or as a packaging film for electronic devices, floppy discs for computers, hospital operating room supplies, and the like.

The present invention is further illustrated by the following examples:

EXAMPLE I

The following ingredients were mixed with stirring:

| Ingredient | Parts by Weight |
| --- | --- |
| radiation curable urethane acrylate oligomer based coating (S-9384 from Raffi and Swanson) | 95 parts |
| triethylalkyletherammonium sulfate (Emerstat 6660 from Emery Industries) | 5 parts |

After the triethylalkyletherammonium sulfate was completely dissolved, an about 0.3 mil thick coating of the mixture was applied on the aluminum vacuum metallized side of a sheet of 5 mil thick polyethylene terephthalate film by a no. 4 wire wound rod. The coating was cured by a 2 megarad dose of electron beam radiation.

EXAMPLE II

The following ingredients were mixed with stirring:

| Ingredient | Parts by Weight |
| --- | --- |
| radiation curable urethane acrylate oligomer based coating (S-9384 from Raffi and Swanson) | 90 parts |
| triethylalkyletherammonium sulfate (Emerstat 6660 from Emery Industries) | 10 parts |

After the triethylalkyletherammonium sulfate was completely dissolved, an about 0.3 mil thick coating was applied on the aluminum vacuum metallized side of a sheet of 5 mil thick polyethylene terephthalate and cured as in Example I.

EXAMPLE III

The following ingredients were mixed with stirring:

| Ingredient | Parts by Weight |
| --- | --- |
| radiation curable urethane acrylate oligomer based coating (S-9384 from Raffi and Swanson) | 85 parts |
| triethylalkyletherammonium sulfate (Emerstat 6660 from Emery Industries) | 15 parts |

After the triethylalkyletherammonium sulfate was completely dissolved, an about 0.3 mil thick coating was applied on the aluminum vacuum metallized side of a sheet of 5 mil thick polyethylene terephthalate and cured as in Example I.

EXAMPLE IV

A Resistivity half-life test was used to evaluate the products of Examples I–III. Each product was suspended between two poles of an electrode. A 100 volt charge was placed on one of the poles and the time for half of the voltage to discharge was measured. The following results were obtained:

| Product of | Time to Half Discharge |
| --- | --- |
| Example I | 0.4 |
| Example II | 0.1 |
| Example III | 0.3 |

EXAMPLE V

A radiation curable coating vehicle was prepared from tripropylene glycol diacrylate, 70 parts; a diacrylate ester prepared from the diglycidyl/ether of bisphenol A and acrylic acid (Celrad 3600, Celanese Resins Co.) 15 parts; an acrylate urethane based on an aromatic isocyanate, (CMD 6700, Celanese Resins Co) 14.7 parts; and a silicone type surface active agent (DC-193, Dow-Corning Corp) 0.3 part.

To 85 parts of the above vehicle there was added 15 parts of the triethylalkyletherammonium sulfate of Example 1. The resultant clear liquid coating having a viscosity of 120 cps was applied by an offset gravure coating station just prior to an electron beam radiation curing unit. The coating was cured with electron beam radiation on the following substrates at the coating weights shown.

| Substrate | Coat Wt. (lbs./3000 ft$^2$) |
| --- | --- |
| 1¼ mil low density polyethylene | 1.6 |
| 60 lb. C2S Paper | 5 |
| ½ mil metallized polyethylene terephthalate | 1.3 (Coating on film side) |
| ½ mil metallized polyethylene terephthalate | 1.3 (Coating on metal side) |
| 1¼ mil metallized low density polyethylene | 1.6 (Coating on metal side) |

Resistance measurements made with a megohm meter (General Radio) showed that all coated surfaces had anitstatic properties with readings in the range of $10^9$ to $10^{10}$ ohms/sq.

A coupling effect was noted when the antistatic coating was applied over metallized surfaces. Readings on an ohm meter were 10–34 ohms/sq. on the coatings on the metal on the metallized ½ mil polyethylene terephthalate, and 150–200 ohms/sq. on the coating on the metal on metallized low density polyethylene.

EXAMPLE VI

An antistatic electron beam curable coating was prepared by mixing with stirring the following ingredients:

| Ingredient | Parts by Weight |
| --- | --- |
| tripropylene-glycol diacrylate | 58.6 |
| epoxy acrylate oligomer (Celrad 3600) | 12.4 |
| urethane acrylate oligomer (CMD-6700, Celanese Specialty Resins) | 12.2 |
| gamma-Methacryloxypropyl-trimethoxysilane | 1.3 |
| silicone surface active agent (DC-193, Dow Corning) | 0.5 |
| triethylalkylether ammonium sulfate (Emerstat 6660, Emery | 15.0 |

| Ingredient | Parts by Weight |
|---|---|
| Industries) | |

The above coating was applied by an offset gravure coating station to a substrate of 1¼ mil low density polyethylene film at a coating weight of 1.6 lbs./3000 ft$^2$, and cured at a speed of 200 ft./min. by electron beam radiation at a dose rate of 3 megarads.

The surface resistivity of the coated side of the above coated polyethylene film was measured at $8.75 \times 10^8$ ohm/sq. at 100 volts and $6.7 \times 10^8$ ohms/sq. at 300 volts. The surface resitivity of the uncoated side of the film measured $1.2 \times 10^9$ ohms/sq. at 100 volts and $1.0 \times 10^9$ ohms/sq. at 300 volts.

EXAMPLE VII

The antistatic electron beam curable coating of Example VI was applied by an offset gravure coating station to the metallized side of 0.5 mil polyester film (polyethylene terephthalate which had been vacuum metallized with aluminum) at a coating weight of 1.3 lbs./3000 ft.$^2$, and cured at a speed of 100 ft./min. with electron beam radiation at a dose rate of 3 megarads.

The surface resistivity of the coated side was measured at $2.2 \times 10^5$ ohms/sq. at 100 volts and overload (too conductive) at 300 volts. The surface resistivity of the uncoated side measured $1.8 \times 10^{12}$ ohms/sq. at 100 volts and $1.6 \times 10^{12}$ ohms/sq. at 300 volts.

EXAMPLE VIII

Example VI was repeated except that the substrate was 60 lb. (per 3300 sq. ft.) clay coated both sides paper. The surface resistivity of the coated side was $1.1 \times 10^{10}$ ohms/sq. at 100 volts and $1.2 \times 10^{10}$ at 300 volts. The surface resistivity of the uncoated side measured $3.8 \times 10^{10}$ ohms/sq. at 100 volts and $3.5 \times 10^{10}$ ohms/sq. at 300 volts.

EXAMPLE IX

Example VI was repeated except that the polyethylene substrate was first metallized by vacuum deposition of aluminum and the coating was applied over the metal. The surface resistivity of the coated side was measured at $1.5 \times 10^5$ ohms/sq. at 100 volts and overloaded (too conductive) at 300 volts. The surface resistivity of the uncoated side measured $1.9 \times 10^{12}$ ohms/sq. at 100 volts and $6.2 \times 10^{11}$ ohms/sq. at 300 volts.

EXAMPLE X

Example VI was repeated except that the substrate was 3 mil lay flat low density polyethylene tubing. The outside of the tubing was coated at a weight of approximately 1 lb./3000 ft.$^2$. The inside of the tubing was found to have an antistatic surface.

What is claimed is:

1. An antistatic resin composition comprising the electron radiation cured reaction product of:
   (A) an electron beam curable prepolymer; and
   (B) an effective amount of a quaternary ammonium compound antistatic agent soluble in said prepolymer.

2. The antistatic resin composition of claim 1 wherein said quaternary ammonium compound is a trialkylalkyletherammonium salt.

3. The antistatic resin composition of claim 2 wherein each of said trialkyl groups has from 1 to about 3 carbon atoms and said alkylether group has an alkyl group having from about 4 to about 18 carbon atoms and said ether group is selected from the group consisting of ethylene oxide and propylene oxide.

4. The antistatic resin composition of claim 3 wherein said quaternary ammonium compound is triethylalkyletherammonium sulfate.

5. The antistatic resin composition of claim 1 wherein said prepolymer comprises an acrylated epoxy oligomer.

6. The antistatic resin composition of claim 1 wherein said prepolymer comprises an acrylated urethane oligomer.

7. The method of making an antistatic resin composition comprising the steps of:
   (A) mixing an electron radiation curable prepolymer and an effective amount of an electron radiation reactive quaternary ammonium compound antistatic agent soluble in said prepolymer to form a solution thereof; and
   (B) contacting said solution with electron radiation sufficient to cure said solution.

8. The method of making an antistatic resin composition of claim 7 wherein said quaternary ammonium compound is a trialkylalkyletherammonium salt.

9. The method of making an antistatic resin composition of claim 8 wherein each of said trialkyl groups has from 1 to about 3 carbon atoms and said alkylether group has an alkyl group having from about 4 to about 18 carbon atoms and said ether group is selected from the group consisting of ethylene oxide and propylene oxide.

10. The method of making an antistatic resin composition of claim 9 wherein said quaternary ammonium compound is triethylalkyletherammonium sulfate.

11. The method of making an antistatic resin composition of claim 7 wherein said prepolymer comprises an acrylated epoxy oligomer.

12. The method of making an antistatic resin composition of claim 7 wherein said prepolymer comprises an acrylated urethane oligomer.

* * * * *